United States Patent Office.

REUBEN KIDEN HUNTOON, FOR HIMSELF, AND JOHN AUGUSTUS LYNCH, ASSIGNEE, BY MESNE ASSIGNMENTS, OF REUBEN KIDEN HUNTOON, OF BOSTON, MASSACHUSETTS.

*Letters Patent No.* 60,192, *dated December* 4, 1866; *reissue No.* 3,759, *dated December* 14, 1869.

IMPROVEMENT IN STEAM-ENGINE GOVERNORS.

The Schedule referred to in these Letters Patent and making part of the same.

*To all persons to whom these presents may come:*

Whereas, Letters Patent, No. 60,192, dated December 4, 1866, have been granted to REUBEN KIDEN HUNTOON, of Boston, of the county of Suffolk, and State of Massachusetts, for an invention having reference to Governors for Steam-Engines, and since the grant of such, have, by assignment duly recorded in the United States Patent Office, been vested in or conveyed to the undersigned, REUBEN KIDEN HUNTOON and JOHN AUGUSTUS LYNCH, of said Boston, who now are the sole proprietors of such Letters Patent, and the exclusive property granted thereby; and whereas, the undersigned have petitioned for leave to surrender such patent for reissue on an amended specification: Now, therefore, be it known that the following description, and the accompanying drawings, constitute a full and exact specification of the said invention.

Of the said drawings—

Figure 1 is a front elevation of the governor, as applied to the throttle-valve of a steam-engine;

Figure 2 is a vertical and transverse section of it;

Figure 3 is a horizontal section of the propeller-cistern;

Figure 4 is a longitudinal section; and

Figure 5, a transverse section of the throttle-valve and its case.

Figure 6 is a top view, and

Figure 7, an edge elevation of the propeller

In such drawings—

A is a close cistern or vase, having a shaft, B, extending down into it axially, and into a tubular bearing, C, arranged on and so as to project upward from the bottom of the said cistern.

Fixed to the said shaft, and arranged within the cistern, is a screw-propeller, D.

Outside of the outer edges of the blades of such propeller, the cistern is provided with a series of vertical ribs or wings, *a a a*, which are projected from its inner surface, they being to aid in preventing the liquid used in the cistern from being revolved therein by the propeller while it may be in rotation.

There is a projection, *b*, on the outside of the tubular bearing C.

In this projection, and leading into the space within the bearing, is a passage, *c*, to which a stop-cock, *d*, is applied.

The passage *c* opens a communication between the interior of the cistern A, and the space immediately beneath the shaft B, the stop-cock being to diminish the communication, as circumstances may require, in order to let flow into and out of the said space, more or less of the liquid in the cistern while the shaft and the propeller may be in revolution.

In the upper part of the cistern A, and surrounding the shaft B, is a tapering deflector, *e*, which, while the shaft is in revolution, operates by deflecting the liquid thrown upward by the propeller, to prevent the escape of such liquid through the shaft-hole or bearing *f*, in the top of the cistern.

The said shaft B has a long gear, *g*, fixed on it.

The said gear engages with another gear, *h*, fixed on a shaft, *i*, which is revolved by a belt proceeding from a pulley driven by the engine, to be regulated by the improved regulator.

A lever, E, jointed to a link, F, which, at its lower end, is jointed to a standard, G, bears on the top of the shaft B, such shaft having a spherical pivot or head, *i*, to enter a semispherical socket made in the lever, and provided with an oiling-hole, *k*.

From the lever E, a connecting-rod, H, (formed with a shoulder, K, and provided with a series of weights, I I′ I″, to rest thereon,) depends, and is jointed to an arm or crank, L, extending from the shaft M of a throttle-valve, N.

This throttle-valve is a hollow cylinder or conic frustum, open at one end and closed at the other, the closed end being fastened to the shaft M, which runs through a stuffing-box, O, of a valve-case, P.

The said valve works in a tubular seat, R, which is surmounted by an annular passage, S.

A conduit, T, leads out of the said annular space.

Another conduit, U, leads out of the open end of the valve-seat, the same being as represented.

Three rectangular openings, *k k k*, made through the valve radially, and at equal distances apart, operate with three openings, *l l l*, formed through the valve-seat.

One side of each of the openings *l* is crowned or arched, as shown at *m*, the same being to let the steam gradually into the opening *k*.

Steam from a boiler is to pass into the annular space S, and, after passing through the valve, is to go into and through the conduit U to the valve-chest of the steam-engine.

On the propeller being put in revolution within the cistern A, filled with a liquid, it will rise in such liquid, and force the shaft B upward, and cause it to raise the lever E. The valve will be moved, in the mean time, so as to diminish the passages for the flowage of steam through it.

As the speed of the propeller may be increased by the engine, the steam-passages of the valve and its seat will be contracted, but, on decrease of the speed, the propeller will fall in the liquid, and the valve-passages will be enlarged. Thus the amount of steam required to work the engine, according to the duty it may have to perform, will be regulated by the governor.

The bearing C and its passage *c*, provided with a stop-cock, *d*, and opening into the liquid-space of the cistern, enable us to apply to the shaft B a force to resist either its rise or its fall or that of the propeller.

By such means, applied to the shaft and cistern of the propeller, we can control the rise or fall of the propeller, as circumstances may require; for, as we may turn the stop-cock, so as to interrupt the flowage of liquid into the chamber beneath the shaft B, we shall bring to operate on the shaft more or less atmospheric pressure, and more or less friction of the liquid in passing the cock, to resist the upward movement of the shaft. The descent of the shaft will be impeded by the liquid drawn into the vacuum-chamber, such liquid making its escape slowly through the cock.

The undersigned do not claim, as the invention of the said HUNTOON, the employment of a pulley and belt for revolving the propeller-shaft, as, when such are used, the propeller, as a regulator, becomes practically useless, owing to the slipping of the belt on the pulley, and the tendency of the belt to run off the pulley when not in the same place with it. Slip of the belt on the pulley renders the propeller inoperative. The long gear *g*, actuated by the narrow gear *h*, is certain, and insures the correct action of the propeller, and gives value to it, in connection with its shaft and case, when used as a governor, as set forth. Consequently the long gear, when employed with the propeller and its shaft and other mechanism, as explained, performs a function not incident to a pulley and belt when used as a motor for the propeller-shaft.

What, therefore, is claimed by the undersigned as the invention of one of them, viz, the said HUNTOON, is as follows, viz:

The combination of the bearing C, its passage *c* and stop-cock *d*, with the shaft B, the propeller D, and the cistern or vessel A, arranged as and for the purpose set forth.

Also, the combination and arrangement of the deflector *e* with the cistern A, the shaft B, and the propeller D, arranged as and for the purpose set forth.

Also, the combination and arrangement of the wings *a* with the cistern A, the shaft B, and propeller D, arranged as set forth.

Also, the governor, as constructed of the propeller D, its shaft B, and case A, and with the long gear *g* applied to, so as to move endwise with the shaft B, and to operate with and be operated by the driving-gear of a shaft, *i*, as set forth.

REUBEN KIDEN HUNTOON.
JOHN AUGUSTUS LYNCH.

Witnesses:
S. N. PIPER,
J. R. SNOW.